W. A. HALL.
HYDROCARBON PRODUCT.
APPLICATION FILED MAY 7, 1915.
1,239,099. Patented Sept. 4, 1917.
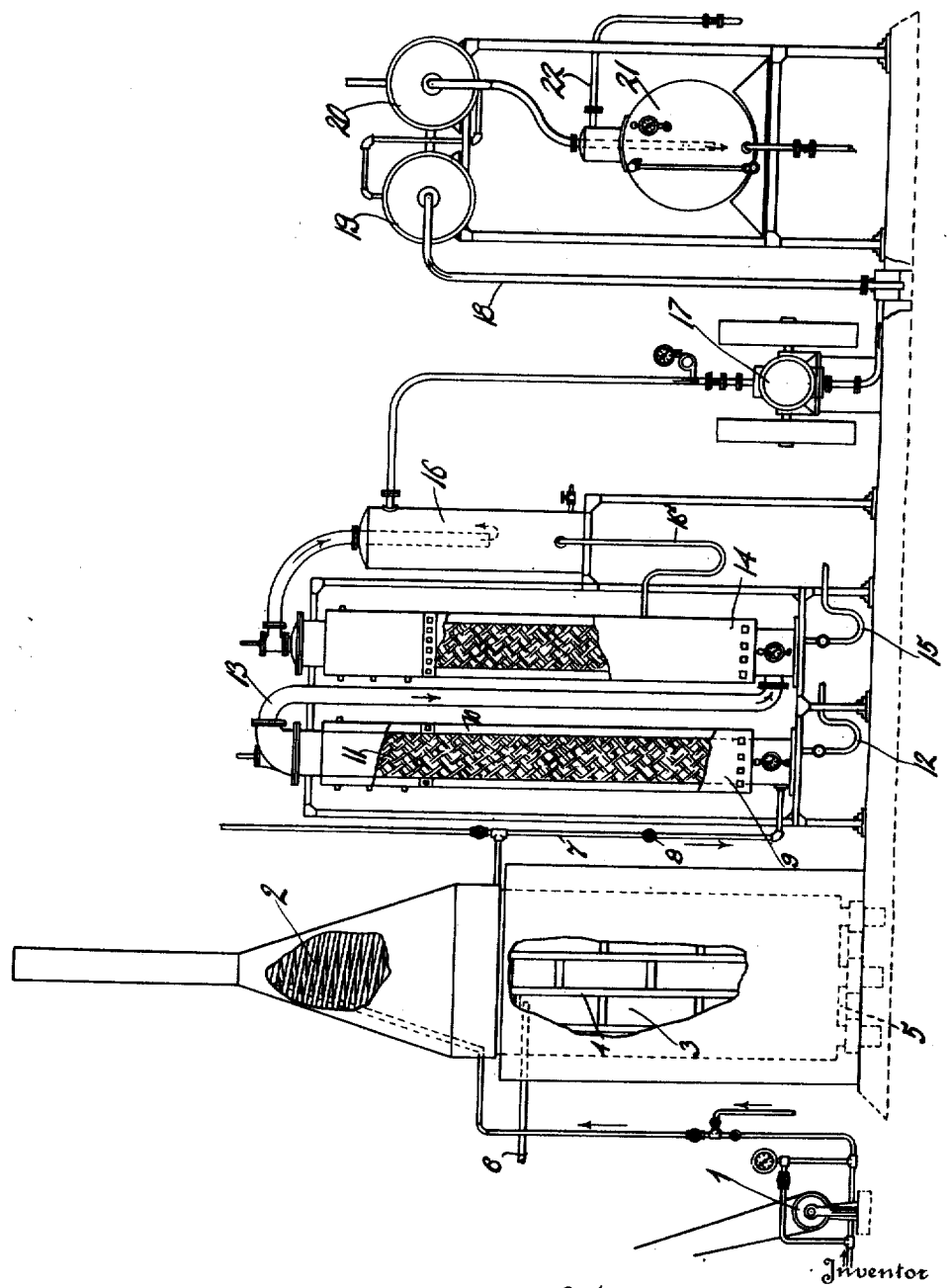
Witnesses
H. O. Harwood
Inventor
William A. Hall
By A. B. Foster
Attorney

UNITED STATES PATENT OFFICE.

WILLIAM AUGUSTUS HALL, OF NEW YORK, N. Y.

HYDROCARBON PRODUCT.

1,239,099.   Specification of Letters Patent.   Patented Sept. 4, 1917.

Application filed May 7, 1915. Serial No. 26,546.

*To all whom it may concern:*

Be it known that I, WILLIAM A. HALL, a citizen of the United States, residing at New York, in the county of New York and State of New York, have invented certain new and useful Improvements in Hydrocarbon Products, of which the following is a specification.

The object of the present invention is the production of a hydrocarbon product, which will have certain properties which are materially different from those of any product, which so far as I am aware, has ever heretofore been produced. Said product may be produced by the process described and claimed in my copending application 3955, filed Jan. 23, 1915, now Patent 1,175,910, but I claim the product itself, however produced.

The process, as described in said application consists essentially, in heating a hydrocarbon oil, such as solar oil, American petrolite, or kerosene, although other oils may be employed, such as crude petroleum, or the still-bottoms left after distilling the gasolene, kerosene and lubricating oils therefrom. The oil in said process is passed into and through a tube or pipe, having a diameter of say, 1 to 3 inches, maintained at a temperature of about 540 to 600° or more, even up to 700° C., (said temperature being measured by a pyrometer placed between the coils of pipe constituting the decomposing retort) preferably at a pressure of about 75 pounds per square inch. Thereafter the vapors and gases are allowed to expand, to substantially atmospheric pressure, and are conveyed through one or more air-cooled receptacles or towers filled with a checker work of broken pottery or the like, in order to allow the temperature to fall to about 180 or 200° C., or even down to 100° C. In these receptacles or towers, the major portion of the undecomposed heavy oils, free carbon, and vaporized materials of which the boiling point is much above the temperature stated, are separated from the remaining gases and vapors. The gases and vapors together with any mist of fine liquid particles carried thereby, are then subjected to a considerable pressure, a pressure of 100 to 125 pounds per square inch being suitable, and during the step of compression, the temperature, instead of rising, drops somewhat, (about 15 or 20 degrees C., or in some cases as much as 38 degrees C., or more, being the observed amount of the drop in temperature in certain experiments which I have made).

The crude product, produced in accordance with this process, for example in experiments 1, 2, 3, 4, 5, 6, 7, 8, 9 and 10, described below, has a more or less disagreeable, varnish-like odor, and contains a material dissolved therein which is of a yellow color, and a resinous colloidal nature. When the fuel evaporates, this remains as a dark-orange, non-drying resinous substance, with a varnish-like odor. This can be removed from the fuel, together with the color of the fuel, by distilling with fullers' earth, or by filtering through the same, or by treatment with sulfuric acid and distilling, or by other appropriate methods. This resinous material may be recovered as a by-product, for use in the arts.

Experiment 1: A gas oil having a specific gravity of .86 was used, the temperature of the decomposing coils was about 600° C. (external, corresponding to a somewhat lower temperature internal, which would necessarily vary more or less between the upper and lower bends of the pipe and would also vary more or less according to the speed of flow) a pressure in the decomposing coils of 75 pounds per square inch, a temperature at the inlet of the compressor of about 180° C., and a pressure at the outlet of the compressor of 125 pounds per square inch. The product, before clarifying, had a disagreeable, varnish-like odor. After distilling, the product is found to consist of a hydrocarbon product, having certain properties as follows:—It has an initial boiling point as low as or lower than ordinary gasolene, and has larger fractions volatile below a temperature of 80° C., than ordinary gasolene. It is substantially free from liability to pre-ignite, and therefore when used as a motor fuel in an ordinary automobile engine "knocking" does not occur, even with the spark advanced. The absence of knocking will obviously produce much less wear and tear on the engine, than would be produced with ordinary gasolene. The mixture of air and the fuel ignites very readily, but the flame does not propagate itself through the mixture of air and vapors as rapidly as with ordinary gasolene. In other words it is slow-burning, hence its freedom from "knocking." On account of the high percentage of low volatile contents, it can be cut at 180° C., or higher, as compared with 160° C., in ordinary gasolene.

Its larger fractions volatile at low temperature have been found to carry complete combustion to the fractions volatile only at the highest temperatures, a considerably increased mileage per gallon consumed being the result.

The low flash point and low initial boiling point give in an engine run on the fuel, great ease in starting in cold weather, and owing to its large fractions volatile at low temperatures, great flexibility (quickness of acceleration) is obtained. It has been found that as great flexibility and ease of starting can be obtained with this fuel when "cut" at 180° C. and of specific gravity 0.760 as can be obtained with a straight gasolene of specific gravity 0.730 "cut" at 160° C.

A distinguishing characteristic of the new fuel is that it contains a proportion of unsaturated hydrocarbons which proportion will naturally vary with the oil used in its production, and with the conditions of operation of the process. It contains a large percentage of hydrocarbons of the ethylene series but is nevertheless quite free from the objectionable features ordinarily inherent in products containing more than a small percentage of hydrocarbons of this series.

The fuel having these peculiar and highly valuable properties is the direct result of an endothermic chemical reaction between a gas which would be permanent under ordinary conditions of temperature and pressure, and a vapor of a hydrocarbon spirit which vapor if condensed to a liquid in the customary manner at atmospheric temperature, would not answer the purpose of a satisfactory motor fuel, the combination of the permanent gas and vapor being effected by mechanical compression at a temperature sufficiently high to maintain the spirit portion under treatment largely or wholly in the state of vapor.

Experiment 2: The oil fed into the apparatus was that known as "Crown Diamond." The converter temperature was 685° C. (external); pressure in converter was 80 pounds per square inch; temperature at a point near the outlet of the last separator before the compressor was 130° C., pressure at the inlet of the compressor was 8 pounds, and at the outlet of the compressor was 110 pounds. The temperatures at the inlet and outlet, at intervals during the test were as follows:

| Temp. at inlet of compressor. | At outlet. |
|---|---|
| 80° C. | 79° C. |
| 82 | 82 |
| 84 | 80 |
| 84 | 83 |
| 86 | 85 |
| 87 | 82 |
| 90 | 87 |
| 90 | 87 |
| 91 | 87 |

In this experiment, the gases and vapors from the last separator were divided into two parts, one part passing directly through a condenser, and the other part passing through the compressor and its condenser. The liquids obtained in the two condensers were then fractionally distilled, up to 240° C., with the following results, "A" being the sample obtained by cooling only, and "B" being the sample obtained by compression and cooling:

| | A. | B. |
|---|---|---|
| Total distillate up to 50° C. | .5% | 5 |
| 60 | 2 | 9 |
| 100 | 18 | 30 |
| 150 | 54 | 57 |
| 180 | 78 | 72 |
| 200 | 88 | 81 |
| 220 | 93 | 88 |
| 240 | 96 | 92 |
| Specific gravity of entire sample | .782 | .740 |
| Bromin number of fraction distilling up to 100° C. | 123 | 145 |

These figures clearly show that the product obtained by compression of the heated gases and vapors is quite a different material from that obtained by cooling only.

Experiment 3: Treating by the manner substantially as above, "Crown Diamond" oil, the following figures were obtained as temperatures and pressures.

| Time. | Converter. | | Cut temperature. | Compressor temperature. | | | Compressor pressure, pounds square inch. | |
|---|---|---|---|---|---|---|---|---|
| | Temperature. | Pressure. | | Before. | After. | Difference. | Before. | After. |
| | °C. | | °C. | °C. | °C. | °C. | | |
| 10.55 | 625 | 75 | 135 | 106 | 82 | 24 | −4 | 125 |
| 11.03 | 625 | 75 | 135 | 106 | 82 | 24 | −4 | 125 |
| 11.12 | 625 | 75 | 136 | 106 | 83 | 23 | −4 | 125 |
| 11.20 | 625 | 75 | 136 | 94 | 79 | 15 | −5.5 | 125 |
| 11.25 | 625 | 75 | 135 | 92 | 75 | 17 | −5 | 125 |
| 11.32 | 625 | 75 | 136 | 91 | 77 | 14 | −5.5 | 125 |
| 11.43 | 625 | 75 | 136 | 89 | 74 | 15 | −5.5 | 125 |
| 12.03 | 625 | 75 | 136 | 92 | 74 | 18 | −5 | 125 |
| 12.13 | 625 | 75 | 136 | 95 | 74 | 21 | −5 | 125 |
| 12.25 | 625 | 75 | 139 | 95 | 74 | 21 | −5 | 125 |

In this experiment, the gases and vapors from the last separator were divided, a part (A) going to one condenser cooled to 0° C., and a part (B) going to the compressor and its condenser. The fractionation and other figures for the two condensates are as follows:

|  | A. | B. |
|---|---|---|
| First drop of condensate | 31° C. | 30° C. |
| Total condensate up to— |  |  |
| 50° C. | 1% | 2% |
| 60 | 2 | 5 |
| 80 | 6 | 15 |
| 100 | 14 | 23 |
| 150 | 50 | 48 |
| 160 | 57 | 60 |
| Specific gravity at 15° C. | .769 | .755 |
| Fraction boiling up to 100° C.: |  |  |
| Bromin number | 132.4 | 150.3 |
| Iodin " | 236.4 | 256.1 |
| $H_2SO_4$ absorption | 68 | 76 |

Considering that there was about 50% more liquid boiling below 100° C. in the product produced after the compression, these numbers point to the presence of an increased quantity of unsaturated products therein. It is exactly these bodies which are formed with the greatest absorption of heat—especially compounds of the acetylene series.

Experiment 4: The temperature of the converter or decomposing retort was kept at 695° C. with a pressure in the converter of 70 lbs. The temperature of the last separator before the compressor was 130° C. The compressor inlet showed −11 inches of mercury, and the outlet 100 lbs. pressure. The temperature at the inlet and outlet of the compressor at intervals during the test run was as follows:—

| Inlet. | Outlet. |
|---|---|
| 98° C. | 74° C. |
| 95 | 75 |
| 92 | 76 |
| 90 | 77 |
| 92 | 76 |

The oil used was Crown Diamond. A connection was made at the inlet of the compressor with a copper coil for condensing, this was placed in a jacket and a water bath kept at the temperature of the inlet of the compressor, namely 93° C. and all liquid condensing at that temperature was collected (sample A). The same arrangements were made directly after the compressor and the water bath kept at the average temperature of the outlet, namely 75° C., and the condensate collected (sample B). All gas and vapor not condensing at this temperature was allowed to escape. A fractionation of these two samples gave results as follows:—

|  | A. | B. |
|---|---|---|
| Total distillate up to— |  |  |
| 50° C. | ½% | ½% |
| 60 | 1% | 1% |
| 100 | 6% | 13% |
| 150 | 32% | 50% |
| 180 | 65% | 75% |
| 200 | 83% | 85% |
| 220 | 93% | 93% |
| 250 | 98% | 96% |
| Specific gravity | .790 | .780 |
| Boiling point (first drop) | 37° C. | 35° C. |
| Total bromin | 56 | 63 |

It is interesting to note that although all the very light fractions of the spirit were allowed to escape because of the high condensing temperature employed, yet there was a difference of over 100% in the amount volatile at 100° C., in the fuel obtained when using the compressor.

Experiment 5: The converter was run at 685° C., converter pressure, 80 lbs. Temperature of last separator 130° C. The pressure gage at the inlet of compressor showed −8 inches of mercury and the outlet 110 lbs. pressure. At the inlet of the compressor the gases and vapors were divided, as above, one part passing to a copper coil condensing tube as mentioned in the previous test, but cold water was used to condense all vapor coming into the coil and to cool all liquid which appeared, (liquid A). The remaining gases and vapors passed into the compressor and were compressed and cooled in the regular cooling coil and receiving tank, (liquid B). The temperature at the inlet and outlet of compressor during the test was as follows:—

| Temperature inlet compr. | 80° C. | Temperature outlet compr. | 79° C. |
|---|---|---|---|
| " " " | 82 | " " " | 82 |
| " " " | 84 | " " " | 80 |
| " " " | 84 | " " " | 83 |
| " " " | 86 | " " " | 85 |
| " " " | 87 | " " " | 83 |
| " " " | 90 | " " " | 87 |
| " " " | 90 | " " " | 87 |
| " " " | 91 | " " " | 87 |

The oil used in this test was Crown Diamond. A fractionation of the two samples shows as follows:—

| Fractionation up to— | Liquid A. | Liquid B. |
|---|---|---|
| 50° C. | 1% | 5% |
| 60 | 2% | 9% |
| 100 | 18% | 30% |
| 150 | 54% | 57% |
| 180 | 78% | 72% |
| 200 | 88% | 81% |
| 220 | 93% | 88% |
| 240 | 96% | 92% |
| Specific gravity | .782 | .740 |

The bromin absorption value of the fractions volatile at 100° C., were as follows:—

|  | Distillate of liquid A (up to 100° C.) | Distillate of liquid B (up to 100° C.) |
|---|---|---|
| Total bromin | 123 | 145 | thus showing that the product produced by compressing the gases and vapors, and cooling the same under pressure contains a larger proportion of unsaturated volatile bodies than did that produced by cooling and condensing the vapors, without compression.

Experiment 6: Crown Diamond oil was treated in a converter at a temperature of 660° C., the gases and vapors entered and left the compressor as shown below:—

*Entering compressor.*

| Pressure. | Temperature. |
|---|---|
| Atmospheric. | 131–136° C. |

*Leaving compressor.*

| Pressure. | Temperature. |
|---|---|
| 125 lbs. sq. in. | 92–99° C. | showing a drop in temperature of about 38° C., (37 to 39° C.).

Experiment 7: With a Mexican solar oil split at about the same temperature the following results were obtained:—

*Entering compressor.*

| Pressure. | Temperature. |
|---|---|
| Just below normal. | 190–200° C. |

*Leaving compressor.*

| Pressure. | Temperature. |
|---|---|
| 120 lbs. sq. in. | 110–120° C. | showing a drop in temperature of about 80° C.

The above figures on temperatures at the inlet and outlet of the compressor give some idea of the fall in temperature obtained and illustrate the greater fall of temperature obtained when working at higher admission temperatures. From Experiment 2 it will be seen that even when we deal with liquids condensing about 100–150° C. not only does the vapor from the condenser contain far more of these liquids, but the liquids have different physical and chemical constants. The last mentioned test confirms the results of test described above.

In all cases, the yield of condensate boiling below 160° C. obtained from any given oil when passing the cracked products and vapors from the converter through the compressor is about one-third greater than the amount which is obtained when the products from the converter are directly condensed. This is, in itself, strong evidence that the compressor has caused a deep-seated reaction. The different physical and chemical constants possessed by the product obtained after pasing through the compressor, conjointly with the drop in temperature taking place in the compressor, point most definitely to one explanation, and one only, namely, the formation of unsaturated hydrocarbons in the compressor cylinder, the production of which is accompanied by an absorption of heat. Not only does this interesting physico-chemical action increase the yield of liquid fuel and diminish the gas produced, but the liquid fuel so formed consists for the most part of unsaturated hydrocarbons, which have a high heat value and these are, for the most part, very volatile liquids which are particularly desirable in a liquid fuel required for high speed internal combustion engines.

The use of mechanical compression on a mixture of the hot vapors and gases with the direct object of producing endothermic reactions is, I believe, entirely new. It is particularly valuable in that it is applicable to work in conjunction with any oil splitting process whatsoever. When it is taken into consideration that ordinary splitting processes generally yield a spirit which is inferior to the actual petrol (gasolene) as regards proportion of lower boiling point fractions and consequently inferior as a motor fuel, the great value of this discovery is made more obvious.

Experiment 8: The oil treated was American petrolite, a distillate having the following properties:

| Specific gravity | .8150. |
|---|---|
| Flash-point | 94° F. |

| First drop | | | Fraction per cent. | Total per cent. over. |
|---|---|---|---|---|
| 110° | to | 120° C. | 1.0 | 1.0 |
| 120 | " | 130 " | 0.5 | 1.5 |
| 130 | " | 140 " | 1.0 | 2.5 |
| 140 | " | 150 " | 5.0 | 7.5 |
| 150 | " | 160 " | 5.0 | 12.5 |
| 160 | " | 170 " | 3.5 | 16.0 |
| 170 | " | 180 " | 5.5 | 21.5 |
| 180 | " | 190 " | 6.5 | 28.0 |
| 190 | " | 200 " | 7.0 | 35.0 |
| 200 | " | 210 " | 5.5 | 40.5 |
| 210 | " | 220 " | 6.0 | 46.5 |
| 220 | " | 230 " | 5.5 | 52.0 |
| 230 | " | 240 " | 7.5 | 59.0 |
| 240 | " | 250 " | 7.0 | 66.0 |
| 250 | " | 260 " | 8.0 | 74.0 |
| 260 | " | 270 " | 7.5 | 82.0 |
| 270 | " | 280 " | 5.0 | 87.0 |
| 280 | " | 290 " | 5.5 | 92.5 |
| 290 | " | 300 " | 4.0 | 96.5 |

Residue, 3.5 per cent.

Specific gravity of the fraction boiling at—

| 110°–200° C. | .7757 |
|---|---|
| 200 –230 " | .8097 |
| 230 –260 " | .8375 |
| 260 –300 " | .8424 |

In this test the petrolite was cracked at 600° to 700° C., under pressure of 75 pounds, as above, the gases and vapors were passed through the first separator to separate out carbon, tar, etc., and thence through the second separator at about 200° C., and the liquid collected in said second separator used in making a second run. The gases entered the compressor at about 100° C., where the pressure was raised, from about atmospheric up to 120 pounds per square inch. A drop in temperature of about 20 degrees C. was noticed.

The following products were produced, in the first run (from petrolite alone):

| Motor fuel, sp. gr. | .760 | 51.8% |
|---|---|---|
| Residue (light) | .847 | 33.8% |
| Residue (heavy) | .857 | 3.9% |
| Gas and loss | | 11.5% |
| | | 100.00% |

The light residue from above, sp. gr. 847, run without any fresh oil:

| Motor fuel, sp. gr. | .769 | 37.64% |
|---|---|---|
| Light residue | | 45.09% |
| Heavy residue | | 7.84% |
| Gas and loss | | 9.43% |
| | | 100.00% |

The total result of the two runs was:—

| Motor fuel | 63.9% |
|---|---|
| Residue | 21.5% |
| Gas and loss | 14.6% |
| | 100.00% |

Experiment 9: The "light residue" produced as in experiment 8, was mixed with the petrolite, and the mixture run through the converter, with the production of the following:—

| | |
|---|---|
| Motor fuel, sp. gr. .760 | 63.68% |
| Residue | 20.28% |
| Tailings | .59% |
| Gas and loss | 15.45% |
| | 100.00% |

In operating in this manner, the plant has been run continuously for 24 hours without choking taking place, and so far as I have been able to ascertain it might be run for an indefinite period if cleaned from heavy residue by blowing steam through the converter and separators for a quarter of an hour once in every twelve hours.

Gas oil or solar oil, specific gravity .850, can be dealt with satisfactorily in place of the petrolite, but if the price is higher, no advantage would be gained, as the yield of motor fuel is lower, as might be expected from the result of cracking the .847 residue alone.

I prefer to speak of the product as "fuel" rather than as "spirit", because in the minds of many people the latter term indicates products all distilling below about 120° C., and in this liquid there are considerable fractions distilling above this temperature, the use of which, in a motor-car engine, is rendered possible by the presence of constituents of lower boiling point than any present in ordinary petrol, or gasolene, or by the larger percentages volatile at 120° C., these constituents imparting an ease in starting the engine from cold and a flexibility in running which should render the new fuel a popular substitute for petrol.

The condensation together under pressure by the pressure hereinbefore described of the heavier hydrocarbon gases with the vapors of the lighter hydrocarbon liquids, gives a product from which the gases show but little tendency to escape at ordinary temperatures. When the liquid is drawn from the collecting tank the escape of the less easily liquefied gases and expansion cause the liquid to be cooled down below the freezing point of water, and when this liquid is brought into a warm room it shows beads of escaping gas for a short time, but this soon ceases and the liquid shows no effervescence such as would occur had the gases been merely dissolved in a cool liquid hydrocarbon under pressure. On distilling the motor fuel it is found that from 9 to 11% of its constituents pass off as gases and vapors which are not re-condensed under ordinary conditions, and the presence of these gives the fuel a higher vapor pressure which is invaluable in the starting of the engine in cold weather.

I give the following comparison of the vapor pressure of the fuel with that of "Pratt's No. 1 Perfection petrol" with the following results:—

Vapor pressure in inches of mercury.

| Temperature. | My fuel. | Pratt's No. 1 petrol. |
|---|---|---|
| 12.8° C. | 2.15 | 0.7 |
| 15.5 " | 3.8 | 1.4 |
| 18.3 " | 5.8 | 2.6 |
| 21.1 " | 7.8 | 3.6 |
| 23.9 " | 9.3 | 4.3 |
| 26.7 " | 12.0 | 5.9 |
| 29.4 " | 14.2 | 7.1 |
| 32.3 " | 16.3 | 8.25 |
| 35. " | 18.4 | 9.3 |
| 37.8 " | 20.6 | 10.5 |

So that the vapor pressure of my fuel may be taken as about double that of Pratt's.

The high pressure of the vapor suggests that trouble might arise through the overheating of a can of the fuel left on the top of a car in the hot sun but under these conditions even if the whole bulk of the liquid became heated to 100 degrees, the pressure on the sides of the can would only be 10 pounds to the square inch, as against 5 pounds given by ordinary petrol, and the cans would stand a much higher pressure than this.

The loss in volume and increase in specific gravity on exposure to air are not as high as might be expected from the vapor pressure. Comparative experiments with No. 1 Pratt's petrol gave the following results:—

Evaporation from a surface of 21 sq. inches at ordinary temperature.

| Time exposed. | My fuel. | Pratt's No. 1. |
|---|---|---|
| 1½ hours | 14.6% | 13.9% |
| 3 " | 18.2% | 19.4% |
| 4½ " | 21.0% | 25.2% |

After this point was reached the evaporation of the petrol became far more rapid than that of my fuel.

The determination of the calorific value of a highly volatile liquid of this character is fraught with many difficulties and the use of a bomb calorimeter is unsatisfactory owing to the difficulty in preventing loss by escape of vapor during the weighing of the liquid and the violence of the explosion.

Vaporizing the spirit in any form of lamp or burner from a wick cannot be employed owing to the heavy fractions of high boiling point present and this difficulty was finally surmounted by atomizing the spirit by pressure in a small reservoir mounted on a balance and burning the volatilized spray in a burner properly dimensioned to insure complete combustion in a Junker calorimeter.

Three determinations, in each of which 10 grams of the fuel were consumed were made, the temperature readings being closely concordant and the calorific value (per 10 grams) calculated from them being:—

*My fuel.*

|   | Gross. | Net. |
|---|---|---|
| 1 | 10,462 calories. | 9,841 calories. |
| 2 | 10,560 " | 9,940 " |
| 3 | 10,493 " | 9,873 " |
| Mean | 10,505 " | 9,884.7 " |
|   | 18,909.6 B.T.U. | 17,622 B.T.U. |

*Pratt's No. 1 spirit.*

|   | | |
|---|---|---|
| 1 | 10,380 calories. | 9,709 calories. |
| 2 | 10,145 " | 9,463 " |
| 3 | 10,182 " | 9,226 " |
| Mean | 10,202.3 " | 9,466 " |
|   | 18,366 B.T.U. | 17,046.8 B.T.U. |

While figures given for Pratt's spirit by several observers are higher than these determinations, the latter are strictly comparative and show the calorific value of my fuel to be slightly higher than that of No. 1 petrol, (about 3% higher in this test) a result borne out by bench tests made with the following comparative results:—

Although the bench test was made on a cold morning, the engine started well with my fuel, and showed perfectly smooth running even with reduced load.

The measurements for the five sets of tests are summarized below:

|   | My fuel. | Pratt's No. 1. |
|---|---|---|
| 1. Full load test: | | |
| Revolutions per minute | 1,000 | 1,000 |
| Kilo-watts, load | 2.93 | 2.99 |
| Gallons per hour | 0.69 | 0.85 |
| Gallons per kilo-watt hour | 0.236 | 0.284 |
| 2. Acceleration test: | | |
| Revolutions per minute | 1,300 | 1,300 |
| Kilo-watts, load | 2.36 | 2.37 |
| Gallons per hour | 0.76 | 1.12 |
| Gallons per kilo-watt hour | 0.322 | 0.473 |
| 3. Reduced load test: | | |
| Revolutions per minute | 1,000 | 1,000 |
| Kilo-watts, load | Nil. | 0.40 |
| Gallons per hour | 0.52 | 0.67 |
| 4. Test at normal speed: | | |
| Revolutions per minute | 1,000 | 1,000 |
| Horse power | 14.5 | 13 |
| Gallons per hour | 1.41 | 1.67 |
| Gallons per horse power-hour | 0.097 | 0.128 |
| 5. Test at increased speed: | | |
| Revolutions per minute | 1,300 | 1,300 |
| Horse power | 17 | 17 |
| Gallons per hour | 1.66 | 2.02 |
| Gallons per horse power-hour | 0.098 | 0.120 |

The exhaust from the engine when running with my fuel was very free from smoke and had no objectionable odor, while Pratt's No. 1, produced both smoke and odor.

It will be noticed that my fuel showed the greatest economy over petrol in the acceleration test and reduced load test, this being due to the rapidity with which the fuel forms the explosive mixture and so insures flexibility in running.

Experiment 10: In order to more fully compare the products produced by treatment in the same manner, from "petrolite" and from the "light residue", the two liquids, were treated separately, producing products of the following properties:—

|   | Motor spirit from "petrolite". | Motor spirit from second residue. |
|---|---|---|
| Specific gravity | .760 | .769 |
| Flash point | Below 60°F. | Below 60°F. |
| First drop | 25° C. | 25° C. |
| Residue and gas | 15%. | 15.25%. |

| Distilling between— | Fraction %. | Total % over. | Fraction %. | Total % over. |
|---|---|---|---|---|
| 25° and 30° C | .0 | .0 | 1.00 | 1.00 |
| 30 " 40 " | 1.75 | 1.75 | 1.25 | 1.25 |
| 40 " 50 " | 2.5 | 4.25 | 2.75 | 5.00 |
| 50 " 60 " | 2.75 | 7.0 | 2.75 | 7.75 |
| 60 " 70 " | 3.0 | 10.0 | 3.0 | 10.75 |
| 70 " 80 " | 3.0 | 13.0 | 3.25 | 14.0 |
| 80 " 90 " | 2.5 | 15.5 | 2.75 | 16.75 |
| 90 " 100 " | 4.0 | 19.5 | 3.25 | 20.0 |
| 100 " 110 " | 5.0 | 24.5 | 4.0 | 24.0 |
| 110 " 120 " | 3.5 | 28.0 | 3.5 | 27.5 |
| 120 " 130 " | 3.0 | 31.0 | 3.0 | 30.5 |
| 130 " 140 " | 6.25 | 37.25 | 4.5 | 35.0 |
| 140 " 150 " | 6.25 | 43.5 | 5.0 | 40.0 |
| 150 " 160 " | 7.0 | 50.5 | 4.75 | 44.75 |
| 160 " 170 " | 7.5 | 58.0 | 6.0 | 50.75 |
| 170 " 180 " | 3.0 | 61.0 | 7.25 | 58.0 |
| 180 " 190 " | 5.25 | 66.25 | 5.5 | 63.5 |
| 190 " 200 " | 5.25 | 71.5 | 5.0 | 68.5 |
| 200 " 210 " | 3.25 | 74.75 | 2.5 | 71.0 |
| 210 " 220 " | 4.25 | 79.0 | 6.5 | 77.5 |
| 220 " 230 " | 2.0 | 81.0 | 3.25 | 80.75 |
| 230 " 240 " | 2.0 | 83.0 | 2.5 | 83.25 |
| 240 " 245 " | 2.0 | 85.0 | 1.5 | 84.75 |

Specific gravity.
Fraction 25° to 80° ................ .6912 ⎫
"        80 to 130 ................ .7522 ⎬ .7462
"       130 to 150 ................ .7740 ⎭
"       150 to 200 ................ .7987
"       200 to 230 ................ .8320

⎧ .8937 ⎫
                                   ⎨ .7543 ⎬ .7470
                                   ⎩ .7865 ⎭
                                     .8118
                                     .8419

The residual gas from the process consists of those gaseous products of the decomposition which are non-liquefiable under the conditions of the experiment. It is composed largely of saturated and unsaturated hydrocarbons, and has a calorific value of 1442.6 British thermal units per cubic foot. The quantity yielded varies slightly with the quality of the oil and other factors, but is approximately 12 cubic ft. per gallon of oil cracked. The high thermal value of the gas makes it a valuable fuel, and it could be used for heating the converters, but it might be found profitable to compress it in cylinders for use in autogenous soldering, or for other purposes.

Experiment 11: An attempt was made to analytically determine the nature and proportions of the permanent gases escaping condensation and also those liquefied, absorbed or combined with the condensing spirit.

Using an American "petrolite" oil with a specific gravity of .815 it was found that on the average 12 cubic feet of permanent gas was formed per gallon of oil subjected to the cracking and condensing process and left the apparatus as gas after the compression and condensing had taken place.

Samples of the escaping gas were analyzed and were found to have the following composition:—

| | |
|---|---|
| Ethylene | 31.1 |
| Ethane | 25.4 |
| Methane | 34.6 |
| Hydrogen | 8.9 |
| | 100.0 | and its calorific value as determined in the Junker's calorimeter was 1442.6 British thermal units per cubic foot.

The determination of calorific value affords a valuable check on the analysis, as, if the analysis be correct, calculations from it should give a calorific value closely approximating to the result obtained experimentally in the calorimeter.

| | | |
|---|---|---|
| Ethylene | $31.1 \times 1712 =$ | 53243.2—B. T. U. |
| Ethane | $25.4 \times 1912 =$ | 48564.8—B. T. U. |
| Methane | $34.6 \times 1073 =$ | 37157.9—B. T. U. |
| Hydrogen | $8.9 \times 347 =$ | 3088.3—B. T. U. |
| | | 142427.2—B. T. U. per 100 cubic feet. |
| | | 1424.2—B. T. U. per cubic foot. |

So that I have:—

| | |
|---|---|
| Calculated | 1424.2 B. T. U. per cu. foot. |
| Determined | 1442.6 " " " cu. foot. | a result well within the errors of calculation and so confirming the analysis.

A portion of the finished fuel from the run made in Experiment 11, after being drawn off and after being allowed to stand until signs of "beading" had ceased and the liquid had been allowed to be warmed up to the temperature of 16° C. was distilled up to 150° C., and the gases and vapors escaping condensation by water cooling were collected and analyzed and were found to consist of:—

| | |
|---|---|
| Unsaturated hydrocarbons | 73.4 |
| Saturated hydrocarbons | 26.5 |

The gas left after absorption by fuming sulfuric acid, on exploding with oxygen yielded carbon dioxid and water vapor in the ratio of 3 to 4 which points to its being propane or a mixture of butane, propane and ethane, while the whole gas on explosion with oxygen gave carbon dioxid and water vapor in the ratio by volume of 5 to 4.1 which strongly points to the unsaturated hydrocarbons consisting (in part) of higher members of the acetylene series a view confirmed by the original fuel giving a heavy precipitate with mercuric chlorid.

Experiment 12: A portion of the original fuel from the run made in Experiment 11, when subjected to ultimate analysis gives as figures:

| | |
|---|---|
| Carbon | 85.9 |
| Hydrogen | 12.76 | a carbon-hydrogen ratio of 6.73 to 1, the carbon being in excess of that required by either the saturated or ethylene series and pointing to the motor fuel being a mixture of these with an even less saturated compound.

The bromin absorption given by the fraction of the fuel distilled up to 150° C. is 101.8 but after acid treatment and steam distillation the distillate gives a bromin absorption number of only 44.7 while the original motor fuel produced in some of the runs gave a bromin absorption number as high as 150; this pointing to the light fractions containing highly unsaturated hydrocarbons.

A point of great value is that the pressure of these highly volatile bodies formed during compression of the gases and vapors at temperatures above 100° C. gives the motor fuel such excellent starting power even in the coldest weather, that it is possible to successfully use fractions of the oil distilling as high as from 200° C. to 230° C., or even 240° C.

In most of the experiments made so far, I have obtained products having greater heat-producing properties (higher B. T. U.) than ordinary .76 gasolene, combined with larger fractions volatile at a temperature below 80° C. or 100° C., than are present in ordinary .76 gasolene, and a much lower flash point than is possessed by ordinary .76 gasolene, and my products have greater efficiency per gallon than ordinary .76 gasolene, as shown by both road and bench tests.

The product appears to always contain considerable amounts of unsaturated hydrocarbons, and to possess the valuable properties of slow burning, quick igniting, and absence of knocking. The specific gravity of the product is, in most of the experiments made so far, above .75 and the highest gravity produced so far is about .80 or slightly higher. The flash points of these two were both lower than the gasolenes of the same gravity.

In another bench test of the power developed by an engine using the fuel, engine No. 1 had the following dimensions:— Bore 121 m. m., stroke 140 m. m., this engine being the Tilling Stevens well-known motor bus type. The petrol employed was "Taxibus" having a specific gravity of .759 at 10° C., my fuel .790 at 15.55° C. "Taxibus" having a high specific gravity is more efficient than the lighter qualities.

The following table gives the results of the tests at various speeds:

*Consumption, pints per H. P.-hour.*

| Horse power. | R. P. M. | My fuel. | Taxibus. |
|---|---|---|---|
| 51.41 | 1,175 | .569 | .636 |
| 42.9 | 900 | .582 | .645 |
| 36.3 | 775 | .566 | .661 |
| 29.7 | 620 | .575 | .649 |

The average consumption was:—

My fuel_____ .573 pints per brake-horse-power-hour.
Taxibus_____ .647 " " " " "

and by weight—

My fuel_____ .565 lbs. per brake-horse-power-hour.
Taxibus_____ .618 " " " " "

These figures show a saving with my fuel of 11.4% by volume and 7.8% by weight, for the same brake-horse-power-hour.

Engine No. 2: Further tests were made with a high speed Vauxhall engine, 95 m. m. bore by 140 m. m. stroke. In this instance the petrol had a specific gravity of .730.

Runs were made with this engine at the following speeds and horse powers:—

| Revolutions per minute. | Horse power. |
|---|---|
| 720 | 19.5 |
| 1,140 | 33 |
| 1,650 | 47 |
| 2,040 | 52 |
| 2,280 | 46 |

The average economy of my fuel over .73 petrol was 9.05% by volume.

In order to obtain the best results with my fuel, slight adjustment of the carbureters was required with both engines to give the best air and fuel proportions.

In addition to running the motors at the maximum speeds runs were made at very slow speeds and the engine given a sudden throttle valve opening. At the slow speed of 150 revolutions per minute the running was quite as steady as with petrol, and quick acceleration was obtained with the opening of the throttle valve; in fact my fuel gave results equal to, or better than, petrol under all conditions of load and throttle opening.

Road tests were made with a Siddeley Deasy car fitted with Knight motor 90 m. m. bore by 130 m. m. stroke. Before taking the final test runs the car was run for some hundreds of miles on my fuel in order to ascertain if there were any difficulties in use, such as carbonization, fouling of ignition plugs, imperfect acceleration, smoking at the exhaust and difficulty in carburation under varying load conditions. With the carbureter adjusted for the fuel, the running was quite as good as with the petrol. The exhaust has a slightly more pungent odor than petrol, but at no time has it been necessary to give any attention to the ignition plugs. The fuel does not appear to cause any detrimental deposit within the cylinders.

The carbureter employed was known as the "Ideal" which is fitted with a jet adjustable from the driving seat. It was therefore quite easy to run petrol and my fuel alternately, and to make comparative tests as to power on grades. However, as accurate results are difficult to obtain on the high roads the final running tests were made at a race track.

The total weight of the car and load was 3,572 lbs., and was run with its usual fittings, wind screen, etc. The petrol employed had a specific gravity of .730.

The following results were obtained:—
At 20 miles per hour:

My fuel_____ 25.6 miles per gallon.
Petrol _____ 24.4 " " "

At 35 miles per hour:

My fuel_____ 20.4 miles per gallon.
Petrol _____ 19.6 " " "

The average consumption was:—

My fuel 23 miles per gallon—36.6 ton miles per gallon.
Petrol 22 " " " —35.08 " " " "

The car was run on both fuels at the highest possible speed with the following results:—

My fuel____ 50 and 51 miles per hour.
Petrol _____ 49 and 52 miles per hour.

The test hill, grade one in four, was taken with both fuels at a minimum speed of 12 miles per hour from a standing start.

The results of these tests enable me to state that my fuel is the best substitute for petrol that has been, so far, brought to my notice. It is without any doubt more economical than petrol. In every test made on the bench and on the road the consumption has in every case been less than petrol for the same work.

As further illustrating the high specific gravity and low boiling points of the product of my process, as distinguished from ordinary gasolene, I will state that in all instances the gravity is higher than that of a gasolene of the same boiling point range.

As above stated my fuel contains a considerable amount of aromatic hydrocarbons, which amount will vary depending upon the various factors, such as kind of oil treated, temperature of converter, temperature of the cut, amount of pressure produced in the compressor and other factors. In many instances I have been able to make this fuel combine with its own weight, or even more than its own weight of nitric acid, forming nitro-aromatic compounds, in this respect differing from ordinary gasolene, which does not unite with nitric acid.

The odor of the refined fuel is quite different from that of petrol or gasolene. If ordinary gasolene or petrol, which is practically all composed of saturated hydrocarbons, such as "Pratt's Perfection spirit" or "Standard Shell spirit" be mixed with denatured ethyl alcohol, in about equal volumes, then approximately two-thirds of the gasolene will be found to be miscible and one third will remain undissolved immiscible. Substantially the same result is obtained when my new fuel is so treated but if the fuel treated with sulfuric acid, and the saturated portions after being washed and refined, be mixed with alcohol, the saturated portion will not be at all miscible, either in ethyl or methyl alcohol.

When the fuel is treated with a small amount of acid, such as sulfuric acid, a sweet aromatic odor is produced, entirely different from the odor of gasolene. The fuel always contains a certain amount of aromatic hydrocarbons such as benzol and toluol, and also contains considerable amounts of unsaturated hydrocarbons, of the olefin and acetylene series, the amount of such unsaturated portion varying between 20% and 50%. The iodin and bromin numbers of the fuel are in accordance therewith.

As above stated, this fuel has a higher calorific value than gasolene and will give about 15% more miles per gallon, in the average motor car.

In using my new fuel, in a automobile engine, there is no difficulty in starting in cold weather, its acceleration is good, and it does not appear to give rise to the formation of carbon deposit within the cylinders to a degree detrimental to the running of the engine.

While in some of the above examples, I have described certain definite temperatures and pressures used in the decomposing retorts, certain definite temperatures and pressures used in the step of removing the solid carbon, tarry matters, certain temperatures and pressures at the inlet and outlet of the compressor, and the like, I call attention that these are for purposes of illustration only, and not as limiting the invention, since I claim herein, the product, irrespective of how the same is prepared.

The boiling point, flash point, distillation table, percentage of unsaturated compounds, percentage of benzol, toluol, etc., amount of acetylene compounds, etc., will depend upon a large number of particular factors, such as the particular oil used, the temperature and pressure in each step of the process, rate at which the oil is fed into the decomposer, and possibly other factors.

The process herein described may be carried out in an apparatus such as is shown in the accompanying drawing, which apparatus forms the subject matter of my copending application 77,357 filed Feb. 9, 1916. In said drawing oil is forced by the pump 1, through the superheating coil 2, heating coil 4, located in a space 3, heated by burners 5. 6 is a pyrometer placed between the coils of the pipe 4. The gases and vapors pass by pipe 7 past the pressure regulating valve 8, into a first cooler 9, surrounded by a cooling jacket 10, and filled if desired with a suitable filling material 11, and any heavy condensate collected therein being drawn off through pipe 12. The gases and uncondensed vapors flow by pipe 13 to a second similar cooler 14, in which a light condensate may separate out, which may be drawn off through pipe 15, to be again introduced from pump 1 into the heating coils. The gases and vapors leaving the upper part of the tower 14, for example at a temperature of 160 to 200° C., pass through a trap 16, wherein a portion of the mist carried by the gases may separate out, and be returned to the tower 14 by means of the pipe 16$^a$. The gases and vapors are then compressed in the pump 17, wherein the endothermic reaction takes place, and are passed by pipe 18 to condensers 19 and 20, the condensate collecting in tank 21, and the uncondensed gas escapes through the pipe 22.

While I have described this product suitable for use as a motor fuel, it can obviously be used for other purposes, for example by nitration, products useful in the manufacture of explosives, dyes, and the like may be produced.

This application is in part a division and continuation of my copending applications as follows:

Serial Number 824,194—filed March 12, 1914,

Serial Number 829,634—filed April 6, 1914, and

Serial Number 3,955—filed January 23, 1915, in which applications I have claimed the processes described herein. The refined motor fuel described herein is not specifically claimed herein, but in my copending application 26,395, filed May 6, 1915.

What I claim is:—

1. A liquid fuel for use in automobile engines having larger fractions boiling at temperatures below 80° C. than any hydrocarbon distillate of the paraffin series with a similar specific gravity and having an initial boiling point at least as low as that of ordinary gasolene, and a calorific value and specific gravity both higher than that of ordinary gasolene, said fuel being relatively free from liability to pre-ignite.

2. A liquid fuel for use in automobile engines having larger fractions boiling at temperatures below 80° C. than a paraffin hydrocarbon distillate with a similar specific gravity and having an initial boiling point at least as low as ordinary gasolene, and a specific gravity at least as high as ordinary gasolene, said fuel being relatively free from liability to pre-ignite, slow burning but igniting quickly, the fuel before refining being of a yellow color, and when evaporated leaving a dark orange non-drying substance with a strong varnish-like odor, the odor disappearing with the coloration by distilling said fuel with mineral matter of the fullers' earth type, said fuel being distinguishable from a product produced by simply a solution of a gas in a liquid, by no greater loss in fractionation than results from the fractionation of ordinary gasolene.

3. A crude motor fuel produced from mineral oil, said fuel having a yellow coloration and peculiar odor and depositing resinous sticky matter on evaporation, the coloring matter and odor being substantially all removable by filtration through fullers' earth, said fuel having a gravity not below about .76, and a calorific value greater than ordinary gasolene.

4. A motor fuel characterized by the properties of slow burning, rapid ignition, flash point and initial boiling point at least as low as those of ordinary gasolene, and having relatively large fractions volatile at low temperature, said fuel having a greater calorific value than ordinary gasolene.

5. A motor fuel containing unsaturated hydrocarbons, said fuel commencing to boil materially below 35° C., not less than about 23% of said spirit being volatile at temperatures below 100° C., said spirit having a specific gravity of not less than .76.

6. A liquid fuel for use in automobile engines having larger fractions boiling at temperatures below 100° C., than any straight gasolene with a similar specific gravity, and having initial boiling point and flash point at least as low as those of ordinary gasolene.

7. A motor fuel suitable for use in internal combustion engines, having gravity between .75 and .81, and having a carbon to hydrogen ratio of about 6.73 to 1.

8. A motor fuel having a gravity of about .76, and having larger fractions volatile below 80° C., than ordinary gasolene of the same gravity, and containing considerable amounts of hydrocarbons having less hydrogen than would correspond to the formula $C_nH_{2n+2}$.

9. A motor fuel of a gravity of between .75 and .80, said fuel containing not less than about 19% volatile at a temperature of 100° C.

10. A hydrocarbon product having a gravity between .75 and .80, containing olefin hydrocarbons, acetylene hydrocarbons, and aromatic hydrocarbons, said product having a carbon to hydrogen ratio of about 6.73 to 1, and having large fractions volatile at 80 and 100° C.

11. A hydrocarbon product having approximately the following distillation table:

| Temperature. | | | Fraction %. | Total over %. |
|---|---|---|---|---|
| Between 25 and | 50° C. | 4.25 to 5.00 | 4.25 to 5.00 |
| " 50 " | 80 | 8.75 to 9 | 13 to 14 |
| " 80 " | 100 | 6.5 to 6 | 19.5 to 20 |
| " 100 " | 130 | 11.5 to 10.5 | 31 to 30.5 |
| " 130 " | 160 | 18.5 to 14.25 | 50.5 to 44.75 |
| " 160 " | 200 | 21 to 23.75 | 71.5 to 68.5 |
| " 200 " | 230 | 9.5 to 12.25 | 81 to 80.75 |
| " 230 " | 245 | About 4 | 85 to 84.75 |

12. A hydrocarbon product of a gravity about .76 to .77, of which the vapor pressure at 26.7° C. is equal to about 12 inches of mercury.

13. A hydrocarbon product of a gravity of about .76 to .77, of which the vapor pressure, at all temperatures between 12.8 and 37.8° C. is materially higher than that of ordinary gasolene of the same gravity, said product having a carbon to hydrogen ratio greater than a product consisting solely of olefins.

14. A motor fuel having a boiling point range of at least from 33° C. to 140° C., and having a gravity between .76 and .77, said product having a carbon to hydrogen ratio greater than a product consisting solely of olefins.

15. A motor fuel containing ethylene hydrocarbons, acetylene hydrocarbons and aromatic hydrocarbons, having a carbon to hydrogen ratio of about 6.73 to 1, and having a fraction not materially below 19.5% volatile at 100° C.

16. A motor fuel of a gravity of .75 to .80 containing endothermic hydrocarbons, and having a carbon to hydrogen ratio materially greater than that of a product consisting solely of olefin hydrocarbons.

17. A motor fuel, having a gravity of about .76, of which not less than 40% distils at temperatures not over 150° C., said fraction having a bromin number not below 100, the carbon to hydrogen ratio of the fuel being about 6.73 to 1.

18. A motor fuel having a gravity between .75 and .81 having a larger fraction volatile at 100° C., than ordinary gasolene, having a bromin absorption number not below 135, a carbon to hydrogen ratio of about 6.73 to 1, containing olefin hydrocarbons, acetylene hydrocarbons and aromatic hydrocarbons, having a higher vapor pressure than ordinary gasolene, having not less than 23% volatile at 100° C., said fraction having a sulfuric acid absorption number of about 76 and a bromin absorption number not below about 150.

19. A motor fuel having a gravity of not below .755, not less than 23% of which distils at temperatures below 100° C., said fraction having a sulfuric acid absorption number of about 76, said fuel in the unrefined state having a yellow color, which color is removable by distillation with fullers' earth.

20. A motor fuel having a gravity of between .75 and .80, the fraction distilling below 100° C. having a sulfuric acid absorption number not below 76.

21. A motor fuel having a gravity of between .75 and .80 the fraction distilling below 100° C. having a bromin number not below about 150, said fuel in the unrefined state having a yellow color, which color is removable by distillation with fullers' earth.

22. A motor fuel having a gravity of between .75 and .80, the fraction distilling below 100° C. having an iodin number not below about 256, said fuel in the unrefined state having a yellow color, which color is removable by distillation with fullers' earth.

23. A motor fuel having a gravity of between .75 and .80 said fuel containing olefin hydrocarbons, acetylene hydrocarbons and aromatic hydrocarbons, and said fuel having a vapor pressure at 26.7° C., equal to about 12 inches of mercury.

24. A hydrocarbon product having a gravity of not less than .74, commencing to distil below 50° C., the fraction distilling below 100° C. having a bromin number not less than 145, said fuel in the unrefined state having a yellow color, which color is removable by distillation with fullers' earth.

25. A motor fuel of a gravity not less than .755 of which not materially less than 23% is volatile at 100° C.

26. A motor fuel of a gravity not less than .755, the fraction thereof distilling below 100° C. having a bromin number of about 150, the entire fuel having a carbon to hydrogen ratio greater than that of a product consisting solely of ethylene hydrocarbons.

27. A liquid fuel having approximately the composition when analyzed of carbon 85.9, hydrogen 12.76, a carbon-hydrogen ratio of about 6.73:1, the carbon being in excess of that required by either the saturated or ethylene series.

28. A liquid fuel yielding when distilled up to 150° C., gases and vapors uncondensed by water cooling, containing about 73.4% of unsaturated hydrocarbons, the gas left after absorption by fuming sulfuric acid on exploding with oxygen yielding carbon dioxid and water vapor in the ratio of about 3:4 and the whole gas on explosion with oxygen giving carbon dioxid and water vapor in the ratio of 5:4.1.

29. A motor fuel consisting essentially of hydrocarbon materials, and containing aromatic hydrocarbons, open-chain saturated hydrocarbons, olefin hydrocarbons, and acetylene hydrocarbons, said fuel having a carbon to hydrogen ratio not far from 6.73 to 1, having a gravity above .76, and having a lower flash point than a saturated distillate of the paraffin series of the same gravity, and a higher calorific value than such a distillate.

30. A hydrocarbon liquid having a calorific value about 3% greater than that of a gasolene of the same gravity.

In testimony whereof I have affixed my signature hereto.

WILLIAM AUGUSTUS HALL.

Witnesses:
RIPLEY WILSON,
O. J. WORTH.